May 28, 1963 G. L. LEITHISER 3,091,413
REEL TRAILER
Filed March 11, 1957 6 Sheets-Sheet 1
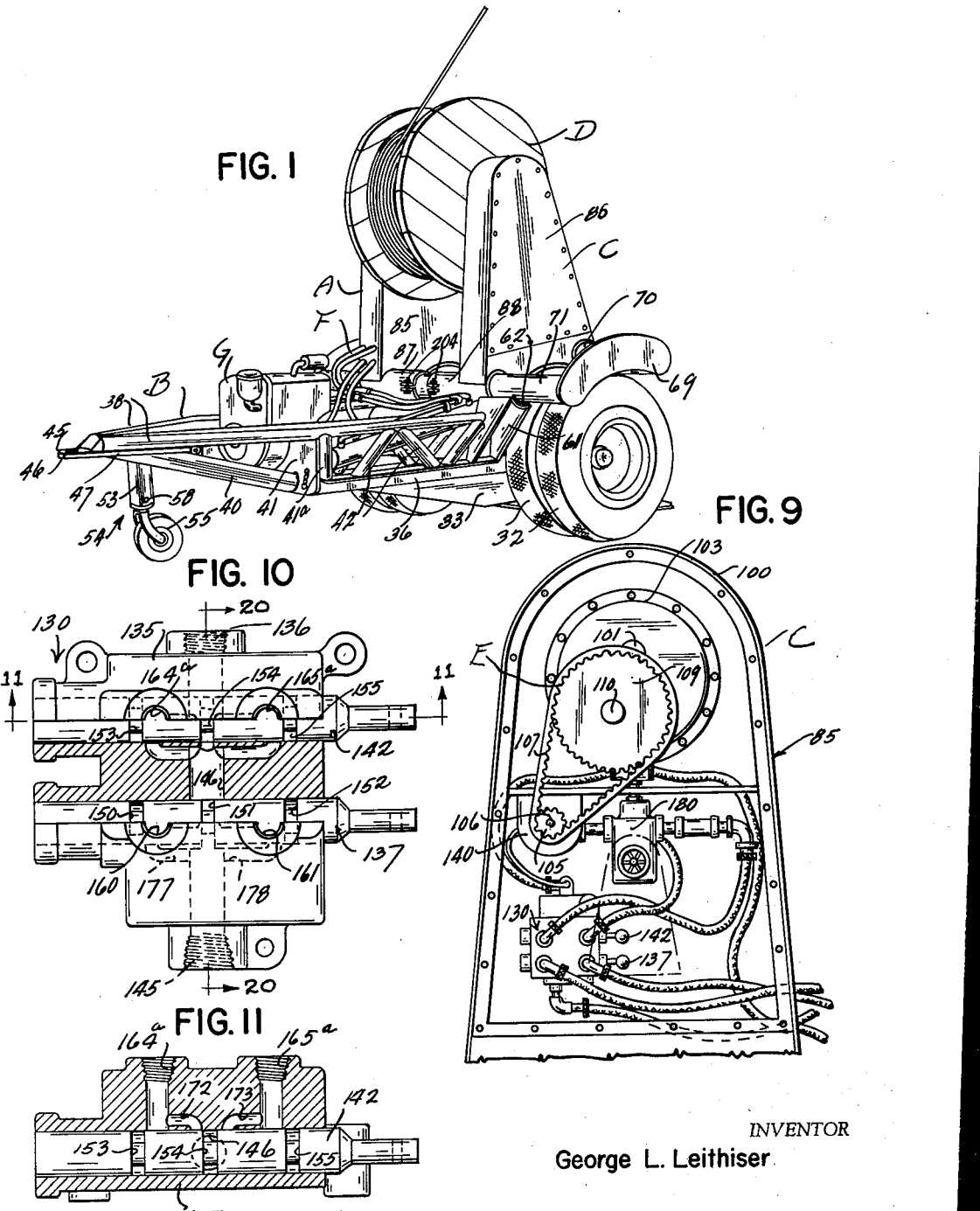
INVENTOR
George L. Leithiser
BY
Lancaster, Allwine Rommel
ATTORNEYS

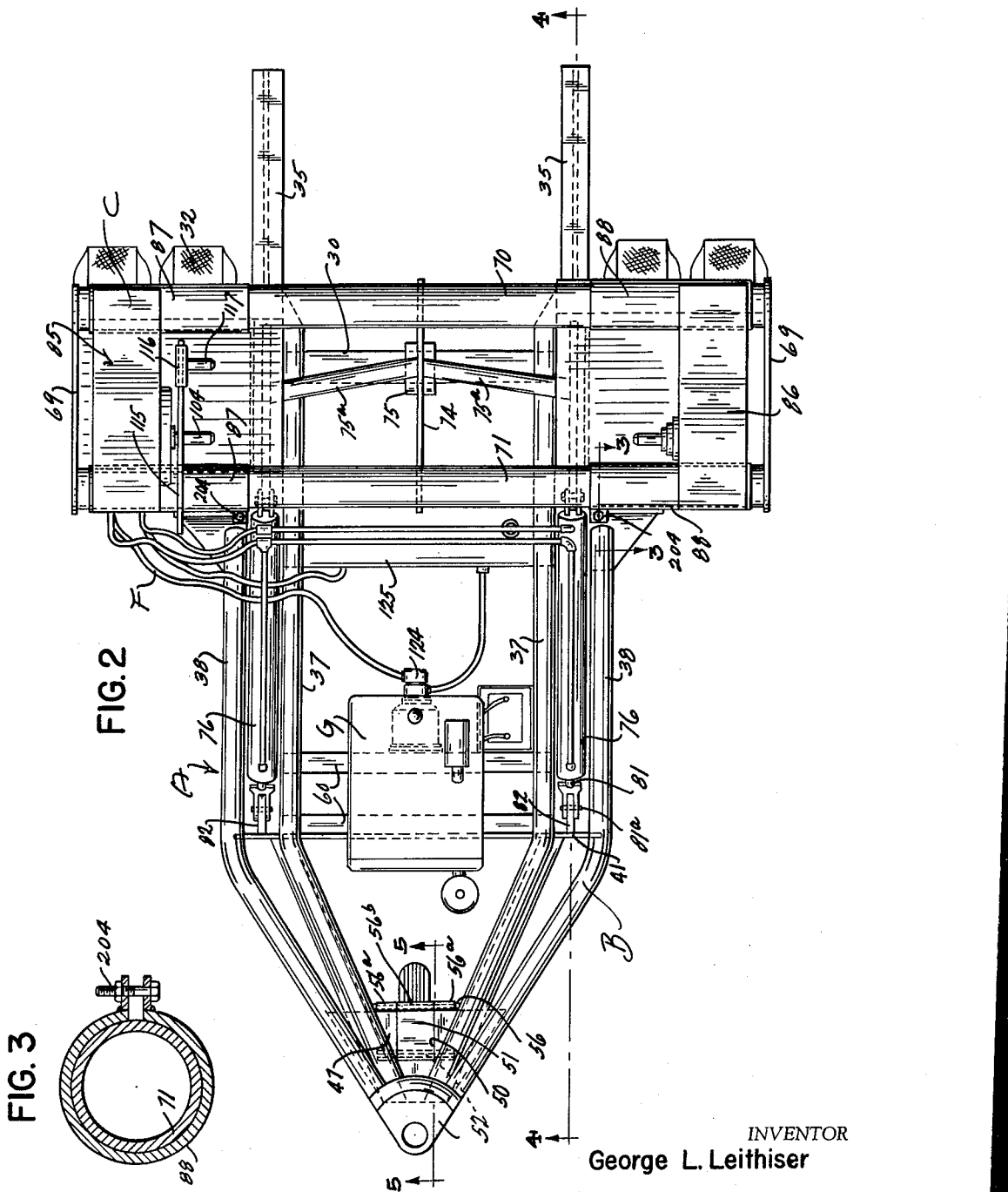

May 28, 1963 G. L. LEITHISER 3,091,413
REEL TRAILER
Filed March 11, 1957 6 Sheets-Sheet 3
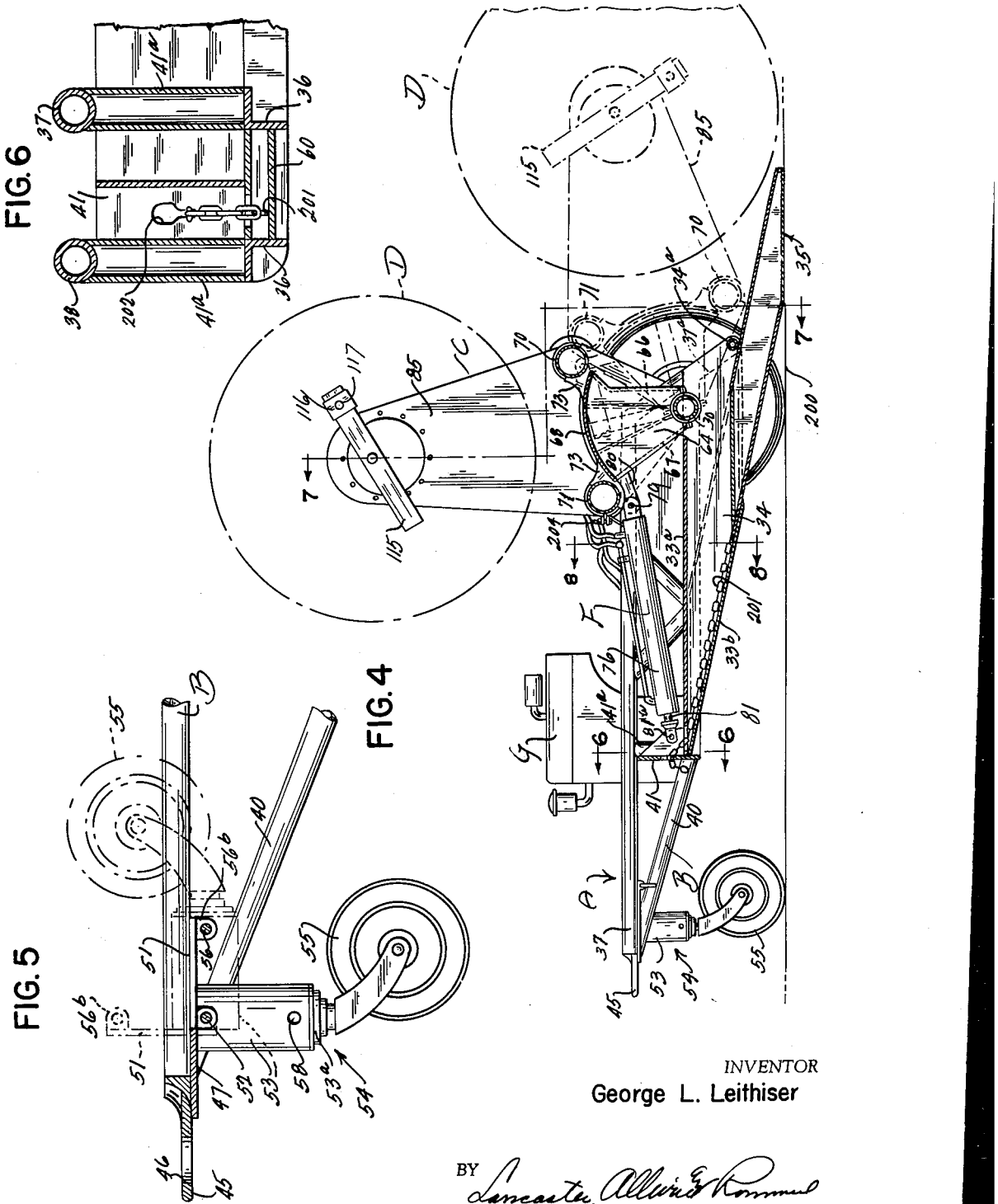
INVENTOR
George L. Leithiser
BY Lancaster, Allwine & Rommel
ATTORNEYS

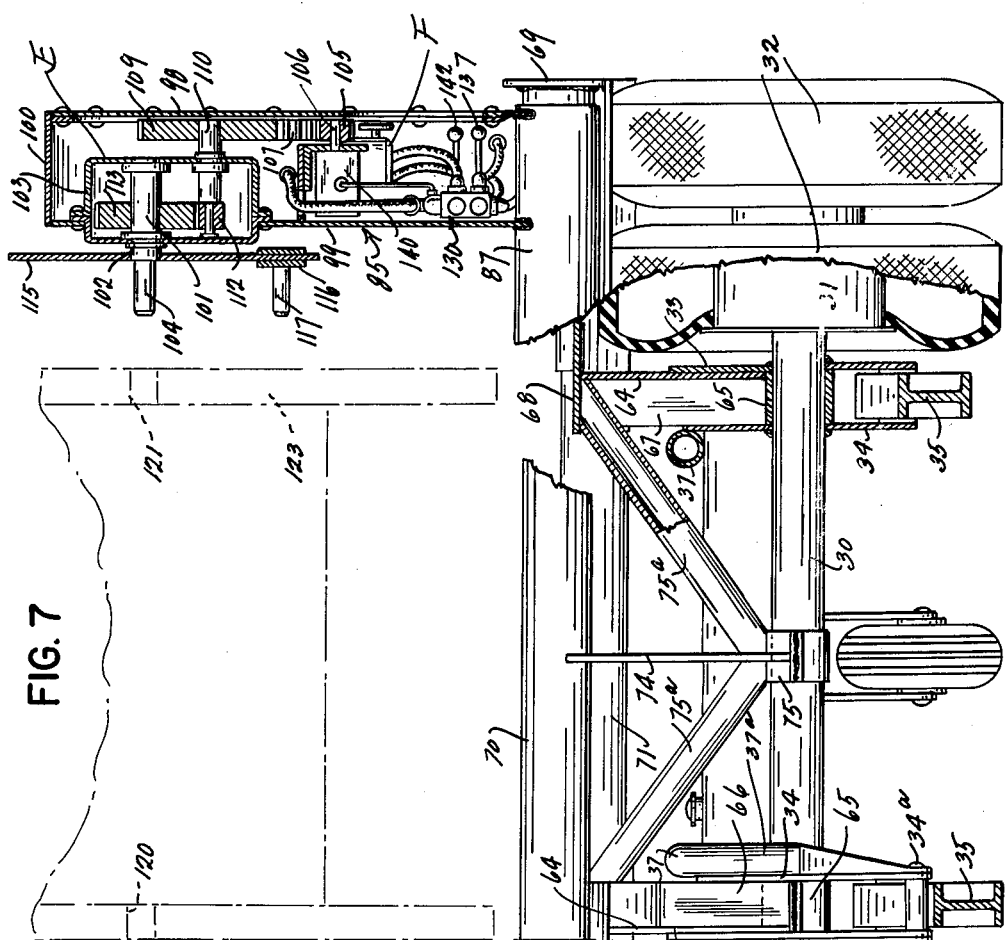

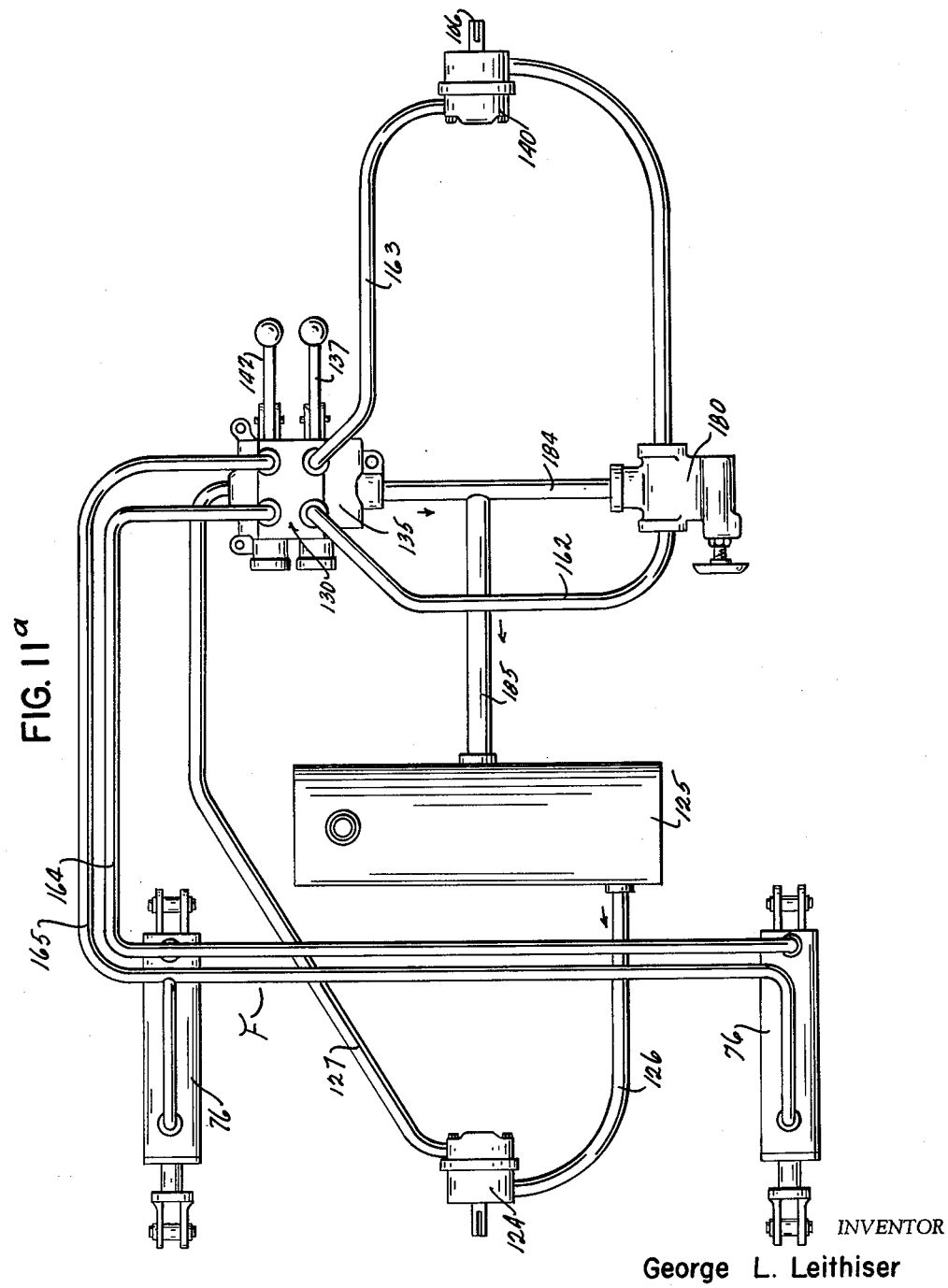

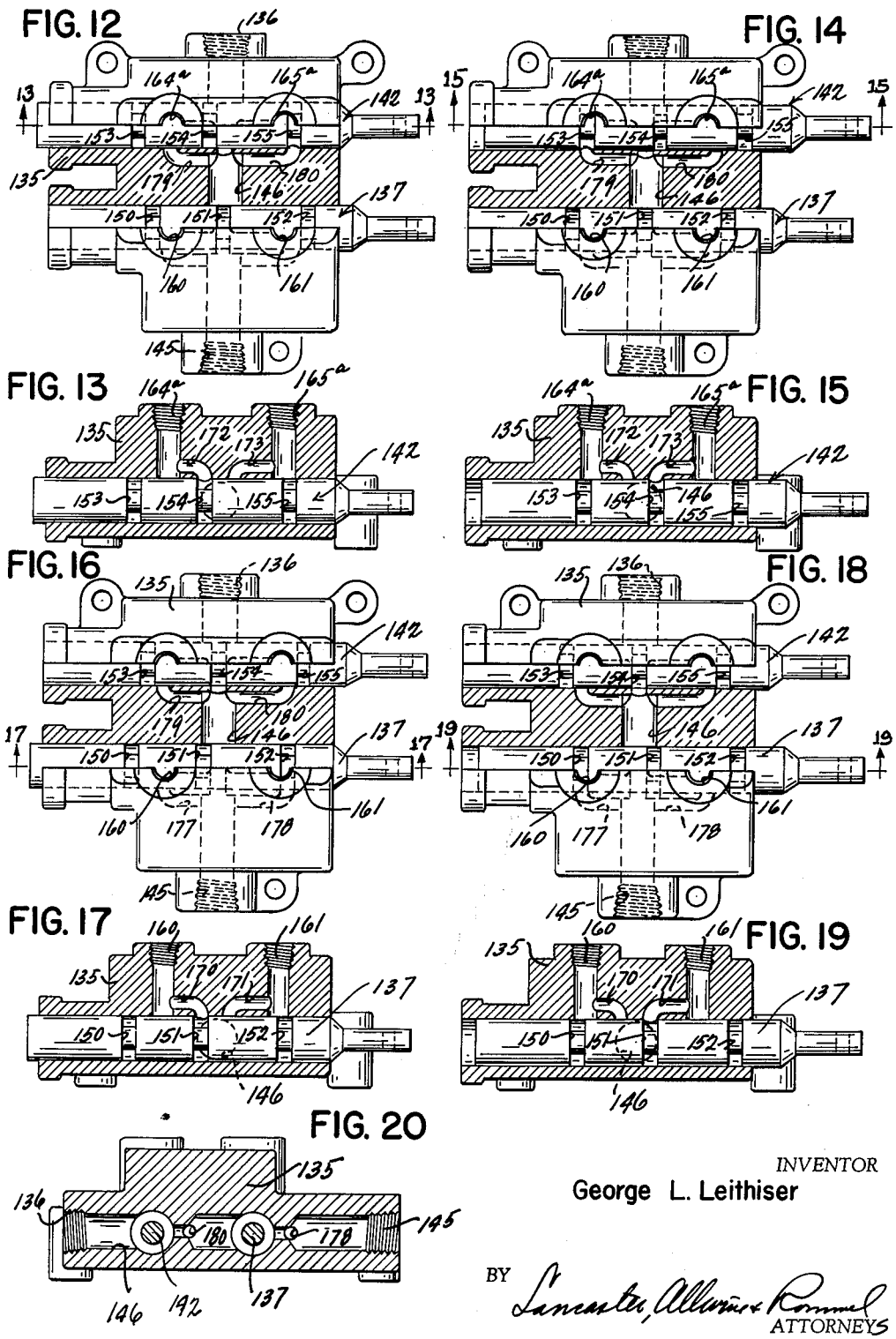

United States Patent Office 3,091,413
Patented May 28, 1963

3,091,413
REEL TRAILER
George L. Leithiser, Columbia, Pa. (R.D. 3, York, Pa.)
Filed Mar. 11, 1957, Ser. No. 645,301
5 Claims. (Cl. 242—86.7)

This invention relates to improvements in trailer equipment for manipulation and handling of reels for the purpose of paying out and tensioning wire conductor cable.

It has heretofore been necessary to de-energize circuits in power lines strung in proximity to a location where new conductor lines were to be installed. With increasing dependency upon electricity for home and industry it is becoming a necessity to string new lines or pull out old lines without de-energizing adjacent line circuits. Furthermore, it has heretofore been the practice of the power companies to transport their reels of cables to a job site by means of miscellaneous vehicles and to support the reels of cables at the stringing site upon jacks or a cart and apply braking force to the reel by means of expedients such as a lever type plank held against the cable roll. This requires the services of two or three men. Usually the pulling force has been supplied by either a line truck with a winch attached, or a line truck moving slowly with a pulling line attached thereto, or by means of various makeshift spools attached to the power take-off of the line truck. Such methods are costly in time, labor, with resultant damage to cables and extreme lack of safety. It is a purpose of this invention to provide mobile equipment in the nature of a reel trailer having running gear to facilitate transportation thereof, including means to lift and lower heavy cable reels; to permit the safe and efficient wire unwinding tensioning of the same and safe and efficient winding of cable upon the reels.

A further object of this invention is the provision of an improved vehicle capable of power actuation to raise and lower a heavy cable reel, stabilize it during the paying out or winding of the cable with respect to the reel, and including means to provide for definite unwinding tension upon the reel when the cable therefrom is being pulled from it.

Other objects and advantages of this invention will be apparent during the course of the following detailed description.

In the accompanying drawings, forming a part of this specification, and wherein similar reference characters designate corresponding parts throughout the several views:

FIGURE 1 is a perspective view of the improved reel handling trailer.

FIGURE 2 is a plan view of the improved trailer showing the reel supporting frame work in upright position, but not supporting a reel.

FIGURE 3 is an enlarged cross sectional view taken substantially on the line 3—3 of FIGURE 2.

FIGURE 4 is a longitudinal cross sectional view taken through the trailer, substantially on the line 4—4 shown in FIGURE 2.

FIGURE 5 is a fragmentary cross sectional view taken through the front running gear of the trailer, substantially on the line 5—5 of FIGURE 2.

FIGURES 6, 7 and 8 are cross sectional views taken substantially on the lines 6—6; 7—7 and 8—8 shown in FIGURE 4 of the drawings.

FIGURE 9 is a fragmentary side elevation of one of the reel supporting arm structures with its cover removed, showing valve and operating mechanism adapted to be used for rotating a reel supported by the device in either direction, and for effecting and controlling the elevation and lowering of the reel supporting arm structure.

FIGURE 10 is a view, partly in cross section, of a four-way control valve used for directing the flow of hydraulic fluid to various mechanisms for winding or unwinding rotation of the reel, and for elevating and lowering of the reel upon the frame structure of the improved trailer; the valves being shown in neutral positions.

FIGURE 11 is a transverse cross sectional view taken substantially on the line 11—11 of FIGURE 10.

FIGURE 11a is a diagrammatical view showing the hydraulic set-up used in the reel trailer.

FIGURE 12 is a view of the valve structures shown in FIGURE 10 but showing one of the valve members in position for directing the hydraulic fluid for extending hydraulic pistons whereby the reel supporting arm construction can be lowered upon the trailer for either receiving or depositing a cable reel with respect to a ground or deck surface.

FIGURE 13 is a cross sectional view taken substantially on the line 13—13 of FIGURE 12 through the effective regulating valve.

FIGURE 14 is a view similar to FIGURE 10 but showing the regulating valve in position to direct fluid for retracting the hydraulic piston mechanism whereby to lift and elevate a cable reel upon the trailer.

FIGURE 15 is a cross sectional view taken substantially on the line 15—15 of FIGURE 14 through the effective valve.

FIGURE 16 is a view of the valve mechanism shown in FIGURE 10 with one of the valves in a position to direct hydraulic fluid for the purpose of counter clockwise rotating the trailer supported reel, looking at the machine from the position shown in FIGURE 4.

FIGURE 17 is a cross sectional view taken substantially on the line 17—17 of FIGURE 16.

FIGURE 18 is a view, partly in section, of the valve mechanism shown in FIGURE 10, but showing a valve in position to direct hydraulic fluid for rotating the reel in a clockwise direction, looking at it from the position shown in FIGURE 4.

FIGURE 19 is a cross sectional view taken substantially on the line 19—19 of FIGURE 18.

FIGURE 20 is a cross sectional view taken through the valve mechanism substantially on the line 20—20 of FIGURE 10.

In the drawings wherein for the purpose of illustration is shown only a preferred embodiment of the invention, the letter A may generally designate the improved reel supporting and handling trailer. It includes a chassis frame B having mounted thereon a movable supporting frame or assembly C for supporting a reel D. Driving mechanism E is provided for rotating the reel D in either direction about its axis. An improved hydraulic system F is provided for raising and lowering the reel D upon the movable frame assemblage C with respect to a deck or ground surface, and for controlling and manipulating rotation of the reel D for tensioned paying out or winding of cable upon the reel spool.

Referring to the chassis frame B, the same has a very durable and compact construction comprising a strong preferably cylindrical shaped axle 30 upon which are mounted wheel drums 31 bolted or otherwise secured to tired wheels 32 in any approved manner. The frame of the chassis B furthermore includes, adjacent to each pair of running wheels 32 outer and inner relatively spaced strong elongated steel plates 33 and 34 which are welded to the axle 30. These plates extend forwardly appreciable distances, as shown in FIGURE 4. At each side of the trailer they are furthermore connected at their rear lower ends by cross rivets or bolts 34a and have top and bottom plates 33a and 33b welded thereto to provide at each side rear opened compartments for retractably receiving and supporting stabilizing members 35, the construction and purpose of which will be described hereinafter.

The chassis also includes pairs of lower angled members 36 at each side thereof, shown in FIGURE 1 and also in the cross sectional view of FIGURE 8, welded to the outer sides of each of the plates 33 and 34. Furthermore, the frame B includes, at each side thereof, relatively spaced upper horizontal frame tubes 37 and 38. As shown in FIGURE 8 the tubes 38 abut the sides of plates 33 and are welded thereto. The tubes 37 are also welded to the plates 34, as shown in FIGURE 8, but they continue rearwardly and downturned at their rear ends 37a and are there also welded to the plates 34 and also connected to the cross rivets 34a (see FIG. 7). As will be noted from FIGURE 2 of the drawings, the front ends of the pairs of tubes 37 and 38 converge inward to a support for the front running gear of the vehicle. Diagonal reinforcing members 40 are connected at their rear ends as by welding to a cross frame plate or member 41 and at their upper front ends to the front running gear support. The plate or cross member 41 may be welded to the angles 36, tubes 37 and 38, and to vertical struts 41a. Diagonal struts 42 connect the lower rail or chassis frame members 36 to the upper frame tubes 37 and 38, as shown in FIGURES 1 and 8 of the drawings. At its front end the chassis frame has rigidly connected thereto, a tie in plate 47, to which the frame members 37, 38 and 40 are welded. A towing plate 45 is part of the plate 47 and may otherwise be welded to the frame. Plate 45 has a towing pin opening 46 therein. To the rear of the towing plate 45 an opening 40 is provided through plate 47 which receives a plate portion or member 51 pivoted at 52 upon the plate 47. To this member 51 is secured a sleeve or standard 53. The front running gear 54 includes a caster wheel 55 having a bearing 53a upon the lower end of standard 53. The plate 51 can be locked in down position, as shown in FIGURE 1, by means of a removable latch or locking pin 56 which engages in barrel portions 56a rearwardly welded to plate 47 and in a complementary barrel 56b welded to the end of plate 51. The front running gear may be locked in upward collapsed position, as shown in dot and dash lines in FIGURE 5 of the drawings, by removing the pin 56 and extending it through the barrels 56a and in an opening 58 provided in sleeve 53 (see FIGURE 5).

The chassis frame B is strengthened by cross pieces 60 welded or otherwse secured to the top frame tubes 37, in the position shown in FIGURE 2. They provide a support or platform for a gasoline engine G and perhaps other accessories.

Adjacent to the movable reel supporting frame assemblage C, I provide upon the chassis frame B, as a rigid part thereof, saddle extensions 61, socketed at 62 (see FIG. 1), to receive portions of the movable reel frame assemblage C, as will subsequently be described.

Referring to the movable reel supporting frame structure C, the same is designed to support a cable reel for fore and aft swinging from lower to upper positions and vice versa. It includes two reel supporting arm structures which are laterally slidable on frame C for relative engagement and dis-engagement with a reel. To that end, two strong substantially fan shaped plates 64 (see FIGS. 4 and 7) are provided at the inner sides of the rear running gear of the vehicle, having sleeve portions 65 which are journaled upon the axle 30, as shown in FIGURE 7. For reinforcement purposes these plates 64 are laterally flanged at their rear edges, at 66, inwardly towards the longitudinal axis of the trailer, and at their fore edges they are similarly transversely flanged at 67; the fan plates 64 and the flanges 66 and 67 operating in the spaces between the chassis frame plates 33 and 34, above described. Arcuately shaped combination fender and support pieces 68 are welded to the plates 64 and their flanges 66 and 67 and lie over the pairs of rear running wheels 32. Welded at the outer rear marginal edges of the pieces 68 are vertical segmental shaped plates 69 (see FIG. 1) adapted to support transverse tubular members 70 and 71. The latter are welded at their ends to the plates 69 and extend in spaced relation cross-wise of the trailer. The members 70 and 71 move in a fore and aft direction, with the movable frame C, about the axis of the axle 30 as a center. Intermediate their ends they are additionally supported by a fan shaped supporting plate 74 having a sleeve 75 which is journaled upon the axle 30, as shown in FIGURE 7. Diagonal bracing tubes 75a extend from the sleeve 75, to which they are welded or otherwise secured, to the side fan shaped plates 64 and the fender plates 68 to which they are also welded or secured at their upper ends, as shown in FIGURE 7. The frame structure C is designed for strength in order to support heavy cable reels.

It will be well at this point to described part of the hydraulic system F as including double acting hydraulic assemblies including cylinders 76 located at each side of the trailer chassis frame in the spaces between the frame tubes 37 and 38. These hydraulic cylinders 76, at their rear ends, are pivoted at 79 to a bracket 80 which is welded or otherwise secured to each of fan plates structure 64. The piston 81 of each cylinder has a pivoted connection at 81a to a bracket 82 welded or otherwise secured to the transverse plate 41 of the chassis frame. Upon extension of the pistons of the hydraulic cylinders, the entire movable frame structure C will be moved, as shown in FIGURE 4, rearwardly to the dot and dash line position. Upon retraction of the piston mechanism in the cylinders 76 the movable frame structure C will be reversely moved for elevating a reel D.

Referring to the arm structures for direct support of a reel D, and which are part of the movable frame assembly C, I provide right and left arm assemblages 85 and 86, respectively mounted upon the sleeve 87 and 88. The latter are slidably disposed upon the frame tubes 70 and 71 for movement of the arm assemblages 85 and 86 towards and away from each other for receiving and releasing reels and receiving reels of different widths.

The arm structure 86 is provided for the sole purpose of supporting the reel and preferably includes plates 90 and 91 welded to the sleeves 88, at their lower marginal edges. They have enclosing border walls 92. A shaft 95 is rotatably supported in any approved manner upon the plates 90 and 91 as by flanged ball bearing assemblies 95a. It has a stub spindle 96 projecting inwardly for supporting one side of the reel D. This shaft 95 may be made detachable in any approved manner.

The arm assemblage 85 partakes of the characteristic shape of the arm structure 86, but houses the driving mechanism assemblage E and part of the hydraulic system. Mainly the same includes outer and inner plates 98 and 99 welded to sleeves 87, and includes surrounding closure walls or plates 100. A reel supporting shaft structure 101 is supported by this arm 85. It is a drive shaft for the reel D.

The drive mechanism E for shaft 101 includes a shaft 101, bearing supported at 102 upon a casing 103 forming part of the arm structure 85. The shaft 101 has a stub spindle 104 projecting inwardly for insertion in an axial socket 121 of the reel D.

The drive reduction gearing includes a pinion 105 rotatably keyed to a motor shaft 106. A belt 107 is trained over gear 105 and a larger gear wheel 109. The latter is keyed to a counter shaft 110 bearing in the gear casing 103. The shaft 110 has a pinion 112 thereon in casing 103, in mesh with a larger gear 113 keyed to the shaft 101.

The spindle 104 has rigidly connected thereto, for rotation therewith, a driving arm 115. A member 116 having an inwardly extending pin 117 thereon is mounted for sliding to various positions along the arm 115.

Referring to FIGURE 7, the reel D has an axial opening 120 at one side thereof for receiving the spindle 96 and also an opposed axial opening 121 for receiving the spindle 104. Reel D furthermore is provided with a side opening 123 spaced from the opening 121 and eccentric to the axis of the reel, adapted to receive the pin or extension 117. It will be apparent that any rotary force applied to shaft 101 will be transmitted to the reel for rotation thereof.

Referring to other details of the hydraulic mechanism, the prime mover or engine G is mounted upon the chassis frame of the vehicle. To the output shaft of the gasoline engine is coupled the shaft of an hydraulic pump 124. The hydraulic pump pulls fluid from a supply reservoir 125 mounted upon the chassis, through a suitable hose or line 126 into its suction or low pressure chamber and thence the fluid is discharged under pressure into line 127 for transmittal to a double hydraulic four-way valve bank 130.

The valve bank 130 is conventional and includes, as shown in FIGURE 10, a casing 135 having an inlet opening 136 to which the line 127 is connected. A plunger type valve 137 is provided for directing hydraulic fluid under pressure to a hydraulic motor 140 for rotating the cable reel D in either direction. Furthermore, the valve bank 130 is provided with a second plunger type valve 142 paralleling valve 137 for regulating fluid pressure for actuating the hydraulic cylinders 76 for raising and lowering the reel through its supporting arms.

The valve bank casing 135 is provided with an outlet opening 145 and has an internal passageway 146 connected between the openings 136 and 145. Across this passageway 146 intermediate parts of both plunger valves 137 and 142 operate.

The valve 137 is provided with annular by-pass grooves 150, 151 and 152, and similarly valve 142 is provided with fluid by-pass grooves 153, 154 and 155.

The casing 135 has a pair of openings 160 and 161 leading to the plunger valve 137 into which openings hose lines 162 and 163 are respectively connected for directing and receiving the fluid for reel rotation operation. Furthermore, the casing 135 includes a second pair of openings 164ª and 165ª into which lines 164 and 165 are respectively connected and which lead to the hydraulic cylinders 76 for extension and retraction of the pistons therein.

In the neutral position of the valves 137 and 142, shown in FIGURE 10, the passageway 146 is opened for passage of hydraulic fluid therethrough around the by-pass grooves 151 and 154, back to reservoir 125.

In the casing 135 the passageways 160 and 161 have lateral ports 170 and 171 which connect therein and cooperate with the valve groove 151 of valve 137, as more particularly shown in FIGURES 17 and 19. Similarly the openings 164ª and 165ª are provided with lateral ducts 172 and 173 opening thereto and which cooperate with the by-pass groove 154 of valve 142, as shown in FIGURES 13 and 15.

The passageway 146 through the casing 135 of the valve bank has communicating therewith a pair of ducts 177 and 178 leading to the valve 137 for respective cooperation with the grooves 150 and 152 thereof. Similarly the casing 135 also has ducts 179 and 180 opening to the passageway 146 which lead to the valve 142 and cooperate with the by-pass grooves 153 and 155 in connection with directional travel of the fluid.

The hose or line 165 leads from the opening 165ª of the valve bank casing 135 and has connection with the fore ends of the hydraulic cylinders 76. The other line or hose 164 has connection in the opening 164ª and has connection with the rear ends of the hydraulic cylinders.

A commercial type manually regulated pressure regulating valve 180 is connected to the lines 162 and 163 of the outlet opening 145 of the valve bank casing 135. It has an exhaust conduit 184 connected thereto and which connects with the discharge opening 145 of casing 135. A line 185 connects the line 184 to the reservoir 125 for conducting the hydraulic fluid back to the reservoir.

The stabilizing feet 35 are structures which collapse into the compartments between the chassis plates 33 and 34 at each side of the trailer. In cross section they are of I-beam shape, as shown in FIGURE 7. The stabilizing feet 35 are shown extended in FIGURE 4. They offer very substantial footing on the ground or a deck surface, indicated at 200 in FIGURE 4, positioned rearwardly of the rear wheel ground contact of the trailer. The feet 35 may be pulled upward into the chassis frame by means of chains 201, anchored through engagement of a link with a keyhole slot 202 on the chassis, as shown in FIGURE 6. The rear ends of the feet 35 are feathered or tapered in order that they can be extended into ground engagement below the reel to be lifted and very close to the ground rest position of the reel.

The sliding sleeves 87 and 88 of the movable frame structure C may be provided with split ends and flanged for receiving clamping bolts 204, as shown in FIGURES 2 and 4 of the drawings, in order that the relatively spaced positions of the arms 85 and 86 may be maintained on the chassis frame against lateral sliding along the tubes 70 and 71 in their farthest spaced positions or their most proximate positions when connected to the reel D. In driving position the arms 85 and 86 will be moved together to engage the various stubs and spindles thereof in the reel sockets 120, 121 and 123 in order to manipulate the reel for the purposes above described.

The sequence of operation involved in use of the trailer for applying resistance or tension during paying out of the cable from a reel, when the same is being strung, comprises the following steps:

(1) With the towing eye attached to another vehicle, such as a line truck, or with the landing gear 54 in down position, extend the stabilizers 35 to prevent tipping of the trailer.

(2) The gasoline engine G is placed into operation to provide hydraulic power. Through operation of plunger valve 142 to the position shown in FIGURES 12 and 13 the hydraulic fluid under pressure enters pipe 164 leading to the cylinders 76. Pressure of the hydraulic fluid entering the cylinder 76 extends the pistons and thus moves the reel supporting arms 85 and 86 rearwardly and downwardly into lowered positions, as shown in the right hand dot and dash line position in FIGURE 4.

(3) The reel supporting arms 85 and 86 are properly spaced to permit the reel D to be rolled therebetween in order that spindles 96 and 104 can enter the axial sockets 120 and 121 of the reel and the crank extension 117 can enter the opening 123. This is effected by manually sliding the arms 85 and 86 along the tubes 70 and 71. The sleeves 87 and 88 may then be clamped into position upon these tubes by means of bolts 204.

(4) Through regulation of valve 142 to positions shown in FIGURES 14 and 15 hydraulic fluid under pressure is then forced into line 165 and its connected lines for retracting the pistons in the cylinders 76. Thus, the entire frame assembly C, together with the reel thereon are elevated to the up position, shown in FIGURES 1 and 4.

(5) The front running gear 54 can then be collapsed to the dot and dash position in FIGURE 5 and the stabilizers 35 retracted. The trailer is then towed to the job site.

(6) When the trailer construction has been properly positioned where a conductor cable is to be strung, the stabilizers 35 are again extended and the landing or front running gear 54 lowered to provide stability for the trailer.

(7) For using the trailer as a tensioning pay-out device the cable on reel D will pay-out from the top of the reel and towards the rear of the trailer, as shown in FIGURE 4. Either an old conductor to be pulled or a rope pulling line previously installed will then be attached to the end of the cable to be unwound from the reel D.

(8) With the engine G running to provide hydraulic power, valve 137 is then regulated to cause the shaft 106 of the hydraulic motor 140 to rotate (through the gearing above described) the reel D in counter clockwise direction, as viewed from FIGURE 4. The position of the valve 137 for this operation is shown in FIGURES 16 and 17. Manipulation of pressure regulating valve 180 will establish the desired torque at the shaft 106, the mechanical linkage and the reel D. Tensioning is obtained through the hydraulic motor 140 tending to rotate the reel in a direction opposite the direction of rotation of the reel through the action of pulling the cable from the reel and paying the same out for line stringing purposes. When the trailer is being manipulated as a tensioning device the hydraulic motor 140 is in reality functioning as a pump acting against a head of hydraulic pressure, which is regulated by valve 180. Through this utilization of the hydraulic motor the torque applied to the reel D to effect tensioning remains constant regardless of the rotational speed of the reel or whether the reel is stopped or even reversed. The actual withdrawal of the cable from the reel with rotation of the reel D clockwise is accomplished by the means used for pulling of the cable located at the other end of the section of the line to be strung.

(9) When the trailer is used as a cable pulling device its tensioning torque values are set higher than the tensioning values of the trailer used for paying out cable.

(10) In FIGURES 12 and 13 the valve parts are positioned for transmittal of hydraulic fluid for extension of the hydraulic cylinder pistons. In FIGURES 14 and 15, the valve parts are positioned for transmittal of hydraulic fluids for retraction of the pistons of the hydraulic cylinders.

(11) In FIGURES 16 and 17, the valve parts are positioned for transmittal of hydraulic fluid to effect counter clockwise rotation of the reel D looking at the reel from the position shown in FIGURE 4. In FIGURES 18 and 19 the valve parts are positioned for direction of hydraulic fluid to effect rotation of the reel D in clockwise direction, with the parts arranged in the position shown in FIGURE 4.

It is within contemplation of this invention to provide a chassis frame for receiving reels in banks for simultaneous stringing of a plurality of lines. The reels can be utilized for underground cable installation if desired, and a power plant may be installed upon the chassis for self powered mobility. The movable frame structure C can be utilized for power pulling of cable poles.

Various changes in the shape, size and arrangement of parts may be made to the form of invention herein shown and described, without departing from the spirit of the invention or scope of the claims.

I claim:

1. In a vehicle for lifting and supporting cable reels and controlling the rotation thereof, the combination of a supporting chassis, a movable frame mounted upon the chassis for lifting and lowering cable reels from a deck or the ground into an elevated position and vice versa on an axis laterally transverse to the chassis, hydraulic means mounted on the chassis to control such movements of the reel through said movable frame, hydraulic means mounted on said chassis and movable frame to effect rotation of the reel in either direction about its axis while elevated upon the chassis for cable tensioning and unwinding purposes, and hydraulic pressure control means located in the last hydraulic means to apply desired torque to the reel under the influence of pulling of cable from the reel for the purpose of tensioning the cable to prevent sag and whip thereof.

2. In a vehicle for lifting and supporting cable reels and controlling the rotation thereof, the combination of a supporting chassis, arms pivotally mounted upon the chassis on a fixed axis with respect to the chassis and movable between substantially a rearwardly extending horizontal position and an upright vertical position on said fixed axis for lifting and lowering cable reels from a deck or ground into an elevated position and vice versa, means on said arms for rotatably supporting a cable reel on an axis laterally transverse to the chassis, a power unit supported by the chassis, a hydraulic pump mounted on the chassis driven by said power unit, a fluid reservoir mounted on the chassis having connection with said pump, hydraulic cylinder and piston means mounted on the chassis frame and connected with said arms for raising and lowering the same, a hydraulic motor mounted upon one of said arms having geared connection with a reel mounted on the arms for rotating the same for rotation in either direction upon said arms, a valve bank mounted upon the arm upon which the hydraulic motor is mounted for controlling hydraulic fluid flow to the motor from the reservoir, and hose line connections between said pump and the hydraulic motor, reservoir and valve bank for guiding fluid pressure therethrough.

3. A hydraulic system as described in claim 2 in which a pressure regulating valve is provided in the line connection between the hydraulic motor and said valve bank for controlling the required torque to be applied to a reel which is to be used for stringing of cable therefrom to prevent sag and whip of the cable during stringing thereof.

4. In a reel carrying trailer for lifting and supporting cable reels and controlling the rotation thereof, the combination of a supporting chassis, running gear for the supporting chassis including an axle, a pair of members extending transverse to the chassis connected together in spaced relation, lever means pivotally mounted upon said axle mounting said pair of members above the chassis for rocking movement fore and aft with the axle serving as an axis, a pair of reel supporting arms above the members and each having means slidably mounted upon said pair of members for movement of said arms along said members in a line transverse to the chassis, means upon said arms for mounting a cable reel thereon, and hydraulic means mounted on said chassis and said arms for swinging movement of said members fore and aft and to rotate the reel in either direction upon its axis mounting upon said arms.

5. A reel carrying trailer as described in claim 4 in which hydraulic pressure control means is provided in the hydraulic means to supply a desired torque to the reel under the influence of pulling of cable from the reel for the purpose of tensioning a cable to prevent sag and whip thereof.

References Cited in the file of this patent

UNITED STATES PATENTS

| | | |
|---|---|---|
| 1,341,176 | Jones et al. | May 25, 1920 |
| 1,949,481 | Koller | Mar. 6, 1934 |
| 2,131,402 | King | Sept. 27, 1938 |
| 2,355,441 | Jacob | Aug. 8, 1944 |
| 2,402,322 | Flynn | June 18, 1946 |
| 2,405,637 | Behrens | Aug. 13, 1946 |
| 2,439,085 | Grzech et al. | Apr. 6, 1948 |
| 2,616,636 | Aden | Nov. 4, 1952 |
| 2,624,522 | Van Hook | Jan. 6, 1953 |
| 2,636,693 | Littell et al. | Apr. 28, 1953 |
| 2,651,498 | Straub | Sept. 8, 1953 |
| 2,677,476 | Bebinger | May 4, 1954 |
| 2,719,730 | Beck | Oct. 4, 1955 |
| 2,740,538 | Felkner | Apr. 3, 1956 |
| 2,759,682 | Garnett | Aug. 21, 1956 |
| 2,810,588 | Rozett | Oct. 22, 1957 |
| 2,834,574 | Sentman | May 13, 1958 |
| 2,848,123 | Keys | Aug. 19, 1958 |